US006778186B2

(12) United States Patent
Mehigan (10) Patent No.: US 6,778,186 B2
(45) Date of Patent: Aug. 17, 2004

(54) METHOD OF AND APPARATUS FOR CARRYING OUT GRAY CONVERSION ON COLOR IMAGE

(75) Inventor: Michael Mehigan, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 239 days.

(21) Appl. No.: 09/902,625

(22) Filed: Jul. 12, 2001

(65) Prior Publication Data

US 2002/0005855 A1 Jan. 17, 2002

(30) Foreign Application Priority Data

Jul. 12, 2000 (JP) ........................................ 2000-210858

(51) Int. Cl.[7] ................................................ G09G 5/02
(52) U.S. Cl. ....................................... 345/596; 345/597
(58) Field of Search ................................ 345/581, 589, 345/593, 594, 596; 382/162, 167; 358/2.1, 3.06, 519, 518, 534

(56) References Cited

U.S. PATENT DOCUMENTS

| | | | | |
|---|---|---|---|---|
| 5,483,259 A | * | 1/1996 | Sachs .......................... 345/600 |
| 5,710,871 A | * | 1/1998 | Tadenuma et al. ......... 358/518 X |
| 5,739,809 A | * | 4/1998 | McLaughlin et al. ......... 345/594 |
| 5,844,542 A | * | 12/1998 | Inoue et al. ................. 345/594 |
| 5,898,436 A | * | 4/1999 | Stewart et al. .............. 345/594 |
| 6,362,829 B1 | * | 3/2002 | Omvik et al. ............... 345/593 |
| 6,538,661 B1 | * | 3/2003 | Farnung et al. ............. 345/594 |

* cited by examiner

*Primary Examiner*—Matthew Luu
(74) *Attorney, Agent, or Firm*—Nixon Peabody LLP; Donald R. Studebaker

(57) ABSTRACT

An original color image data is converted to halftone image data having information on density of pixels by a predetermined gray conversion. The predetermined gray conversion includes an RGB ratio adjustment, an RGB ratio adjustment is carried out on reference image data employing different ratios of R, G and B, the results of the predetermined gray conversions including the RGB ratio adjustments employing the different ratios of R, G and B carried out on the reference image data are graphically shown on a screen, an optimal value of the ratio of R, G and B is determined on the basis of comparison of the results of the predetermined gray conversions graphically shown on the screen, and the predetermined gray conversion including an RGB ratio adjustment employing the optimal value of the ratio of R, G and B is carried out on the original color image data.

16 Claims, 9 Drawing Sheets

METHOD OF AND APPARATUS FOR CARRYING OUT GRAY CONVERSION ON COLOR IMAGE

BACKGROUND OF THE INVENTION

1. Field of the Invention

This invention relates to a gray conversion method and a gray conversion apparatus for carrying out a gray conversion on image data representing a color image in order to output a color image having a halftone to a monochromatic printer.

2. Description of the Related Art

Recently almost all the digital images are color images having a halftone part owing to advance in image processing, reduction in price of data storage devices such as memories and hard discs, and the like. Though color printers are being popularized, color images having a halftone are often output through a monochromatic printer. Further color images are sometimes output through a monochromatic printer for a special effect. When image data representing a color image having a halftone is input into the monochromatic printer as it is, the print output through the monochromatic printer generally becomes too strong in contrast and becomes blackish or whitish. Accordingly, in order to improve finish of the print, it is necessary to convert the color image data to halftone image data having information on density of pixels and a proper γ-characteristic.

In the conversion process for converting color image data to density information data, gray conversion is a very important process which governs finish of the print.

The gray conversion is generally effected by γ-correction or color adjustment (e.g., RGB ratio adjustment). It is preferred that both the γ-correction and the color adjustment be carried out as the gray conversion. However, there has been developed no image application software which carries out both the γ-correction and the color adjustment though there has been developed image application software which carries out only the γ-correction or the color adjustment.

When an image is reproduced by a monochromatic printer on the basis of color image data, finish of the prints cannot be controlled by the printer. Accordingly, the color image data should be input into the printer after subjected to the gray conversion. Though the gray conversion may be carried out by a printer driver, there has not been developed a printer driver which carries out the RGB ratio adjustment which greatly affects the result of the gray conversion. Though there has been known a printer driver which carries out the γ-correction, the result of the γ-correction cannot be known unless prints are made on the basis of the corrected image data.

SUMMARY OF THE INVENTION

In view of the foregoing observations and description, the primary object of the present invention is to provide a gray conversion method and a gray conversion apparatus which permits the operator to carry out RGB ratio adjustment on color image data control as the gray conversion while visually recognizing the result of the RGB ratio adjustment so that the color image data can be effectively and properly converted to halftone image data having information on density of pixels.

In accordance with a first aspect of the present invention, there is provided a gray conversion method for converting original color image data to halftone image data having information on density of pixels by a predetermined gray conversion, the halftone image data being to be input into a monochromatic printer when a color image represented by the original color image data is to be printed by the monochromatic printer, the method characterized in that said predetermined gray conversion includes an RGB ratio adjustment for setting the ratio of R, G and B in the original color image data to an optimal value, an RGB ratio adjustment is carried out on reference image data (e.g., image data derived from the original color image data or image data representing a color map) employing different ratios of R, G and B, the results of the predetermined gray conversions including the RGB ratio adjustments employing the different ratios of R, G and B carried out on the reference image data are graphically shown on a screen, the optimal value of the ratio of R, G and B is determined on the basis of comparison of the results of the predetermined gray conversions graphically shown on the screen, and the predetermined gray conversion including an RGB ratio adjustment employing the optimal value of the ratio of R, G and B is carried out on the original color image data.

The reference image data may be, for instance, image data derived from the original color image data or image data representing a color map.

The "image data derived from the original color image data" may be any image data derived from the original color image data and may be the original color image data as it is. However it is preferred in view of the facility of gray conversion that the image data derived from the original color image data be image data representing a reduced original image.

The "color map" is obtained by arranging, in a pattern of a pallet, colors obtained by thinning, at a predetermined ratio, colors generated by all the combinations of densities of R, G and B, and does not depend upon the original color image data to be processed.

The RGB ratio adjustment is to adjust the ratio of coefficients α, β and χ in the following formula.

$$Gray = \alpha Red + \beta Green + \chi Blue$$

It is preferred that the gray conversion method in accordance with the first aspect of the present invention be carried out by a utility which is positioned between image application software and a printer driver and operates in combination with the printer driver, a printer driver, or a print control system of an OS (operating system).

It is further preferred that said predetermined gray conversion includes, in addition to the RGB ratio adjustment, a γ-correction in which the γ-curve and/or the γ-value is adjusted, a γ-correction is carried out on the reference image data employing different γ-curves and/or γ-values, the results of the γ-correction carried out on the reference image data employing the different γ-curves and/or γ-values are graphically shown on a screen, the optimal γ-curve and/or the γ-value is determined on the basis of comparison of the results of the γ-correction graphically shown on the screen, and the predetermined gray conversion including an RGB ratio adjustment employing the optimal value of the ratio of R, G and B and a γ-correction employing the optimal γ-curve and/or the γ-value is carried out on the original color image data.

In accordance with a second aspect of the invention, there is provided a gray conversion apparatus comprising a gray conversion means which carries out a predetermined gray conversion on original color image data to convert the original color image data into halftone image data having information on density of pixels, the halftone image data being to be input into a monochromatic printer when a color image represented by the original color image data is to be printed by the monochromatic printer, the apparatus characterized in that the gray conversion means includes an RGB ratio adjustment means which carries out an RGB ratio adjustment for setting the ratio of R, G and B in the original color image data to an optimal value and carries out an RGB ratio adjustment on reference image data (e.g., image data derived from the original color image data or image data representing a color map) employing different ratios of R, G and B, a graphic display means which graphically shows the results of the predetermined gray conversions including the RGB ratio adjustments employing the different ratios of R, G and B carried out on the reference image data on a screen, and an RGB ratio determining means which determines the optimal value of the ratio of R, G and B on the basis of comparison of the results of the predetermined gray conversions graphically shown on the screen, and the gray conversion means carries out the predetermined gray conversion including an RGB ratio adjustment employing the optimal value of the ratio of R, G and B determined by the RGB ratio determining means on the original color image data.

It is preferred that the gray conversion means be in the form of a utility which is positioned between image application software and a printer driver and operates in combination with the printer driver, in the form of a printer driver, or in the form of a print control system of an OS.

It is further preferred that said gray conversion means further comprises a $\gamma$-correction means which carries out a $\gamma$-correction on the reference image data employing different $\gamma$-curves and/or $\gamma$-values, a graphic display means which graphically shows the results of the $\gamma$-corrections carried out on the reference image data employing the different $\gamma$-curves and/or $\gamma$-values on a screen, and a $\gamma$-correction condition determining means which determines the optimal $\gamma$-curve and/or the $\gamma$-value on the basis of comparison of the results of the $\gamma$-correction graphically shown on the screen, and the gray conversion means carries out the predetermined gray conversion including an RGB ratio adjustment employing the optimal value of the ratio of R, G and B and a $\gamma$-correction employing the optimal $\gamma$-curve and/or the $\gamma$-value on the original color image data.

In accordance with the present invention, since the influence of the RGB ratio adjustment on the gray conversion is graphically shown on a screen, the result of the gray conversion can be known without making prints on the basis of a selected ratio of R, G and B, whereby a gray conversion including an RGB ratio adjustment can be efficiently carried out on color image data.

Further when the gray conversion is carried out by a utility which is positioned between image application software and a printer driver and operates in combination with the printer driver, a printer driver, or a print control system of an OS, the gray conversion can be carried out independently of the image application software.

Further when the predetermined gray conversion includes a $\gamma$-correction in addition to the RGB ratio adjustment, the results of the $\gamma$-correction carried out on the reference image data employing the different $\gamma$-curves and/or $\gamma$-values are graphically shown on a screen, the optimal $\gamma$-curve and/or the $\gamma$-value is determined on the basis of comparison of the results of the $\gamma$-correction graphically shown on the screen, and the predetermined gray conversion including an RGB ratio adjustment employing the optimal value of the ratio of R, G and B and a $\gamma$-correction employing the optimal $\gamma$-curve and/or the $\gamma$-value is carried out on the original color image data, the result of the gray conversion can be known without making prints on the basis of a selected ratio of R, G and B and a selected $\gamma$-curve and/or $\gamma$-value, whereby a gray conversion including an RGB ratio adjustment and a $\gamma$-correction can be efficiently carried out on the color image data.

DESCRIPTION OF THE PREFERRED EMBODIMENT

Figure 1:
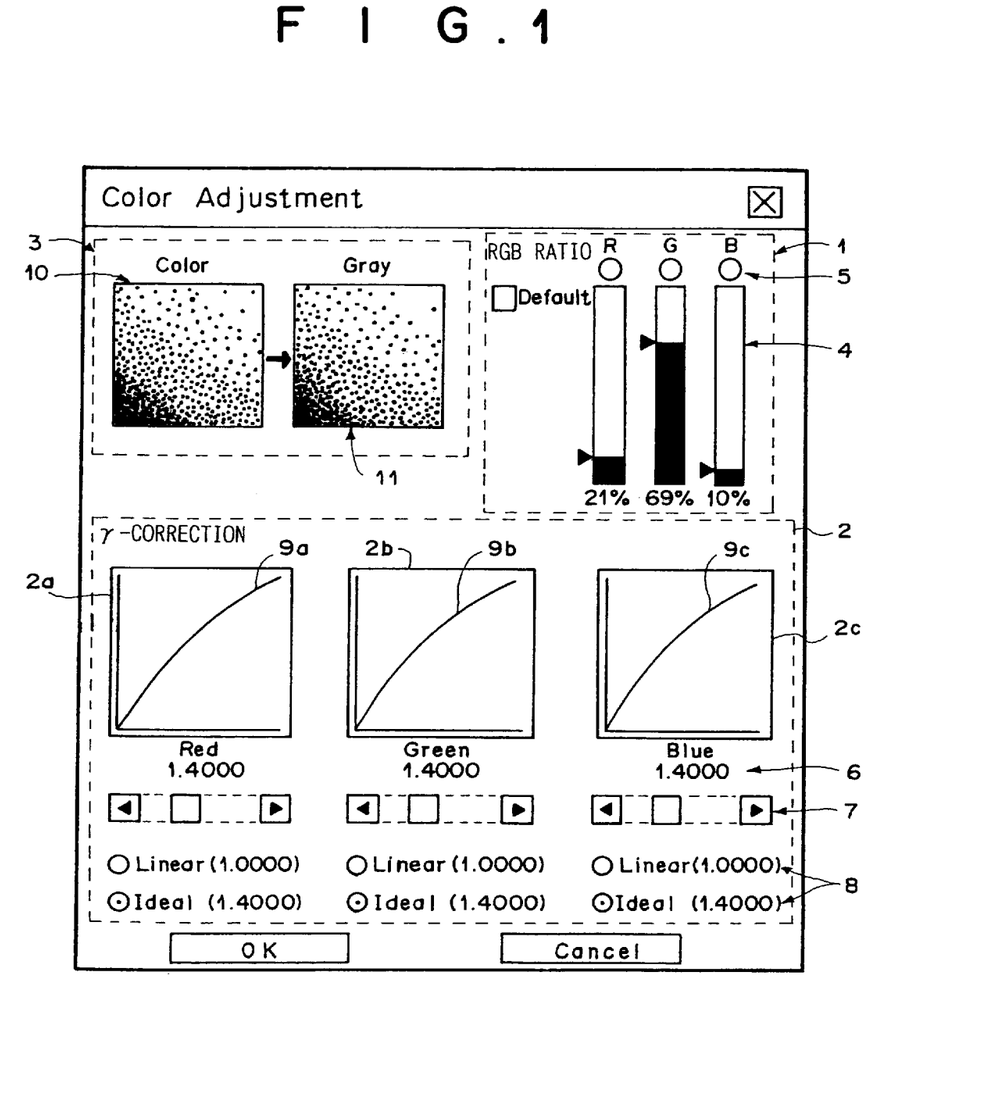
FIG. 1 is a view of a frame showing a user interface of a gray conversion apparatus in accordance with an embodiment of the present invention.

As shown in FIG. 1, a gray conversion apparatus in accordance with an embodiment of the present invention comprises an RGB ratio adjustment means 1, a $\gamma$-correction means 2 including $\gamma$-curve output means 2a, 2b and 2c and a gray level display means 3 which graphically shows the influence of the RGB ratio adjustment and the $\gamma$-correction on the gray conversion.

In the RGB ratio adjustment means 1, the ratio of Red, Green and Blue is adjusted by controlling respective slide bars 4 with a mouse pointer (not shown). The RGB ratio is expressed in percentage, and the percentages for R, G and B are set so that the sum of their percentages is fixed to 100. That is, when the percentage of one of R, G and B is changed, the percentages of the other two colors are automatically changed so that the sum of the percentages of the three colors become 100. This process will be described in detail later with reference to FIG. 4.

The RGB ratio adjustment means 1 is provided with three lock buttons 5, each for one of R, G and B. When the lock button 5 for one of R, G and B is clicked, the percentage of the color is fixed with the percentages of the other two colors variable. This process will be described in detail later with reference to FIG. 3.

The RGB ratio adjustment means 1 is further provided with a default box. When the default box is checked, the percentages of R, G and B are automatically set to preset values (the default values). This process will be described in detail later with reference to FIG. 2.

In the γ-correction means 2, three γ-curves 9a, 9b and 9c for R, G and B are displayed for given γ-values 6. The γ-values 6 can be changed by controlling slide bars 7. That is, when the γ-values 6 are changed by controlling slide bars 7, γ-curves 9a, 9b and 9c corresponding to the changed γ-values are shown in the γ-correction means 2. Two default γ-values 8 are set for each of R, G and B. One of two default γ-values 8 for each of R, G and B is selected by checking a radio button. One of the two default γ-values 8 for each of R, G and B is 1.0000 (linear) and the other is, for instance, 1.4000 which is recommended by the printer maker (ideal). When 1.0000 is selected, the γ-curve is a straight line inclined at 45° and the γ-correction becomes in effective. That is, input values are all output unchanged.

By controlling the slide bar 7, the γ-value for each of R, G and B can be varied within the range of 0.2500 to 6.55535.

The γ-curves 9a, 9b and 9c are displayed for the γ-values selected.

Each process of the γ-correction will be described in detail later with reference to FIGS. 5 to 8.

The gray level display means 3 comprises a color map 10 and a gray level representation 11. As described above, the "color map" is obtained by arranging, in a pattern of a pallet, colors obtained by thinning, at a predetermined ratio, colors generated by all the combinations of densities of R, G and B. The gray level representation 11 shows the result of a gray conversion carried out on the respective pixels of the color map 10. The gray level governs finish of the print when a color image is output through a monochromatic printer. The gray level representation 11 is updated each time the RGB ratio is changed or the γ-values are changed. The processing of updating the bit map of the gray level representation 11 will be described in detail later with reference to FIG. 9.

Figure 2:
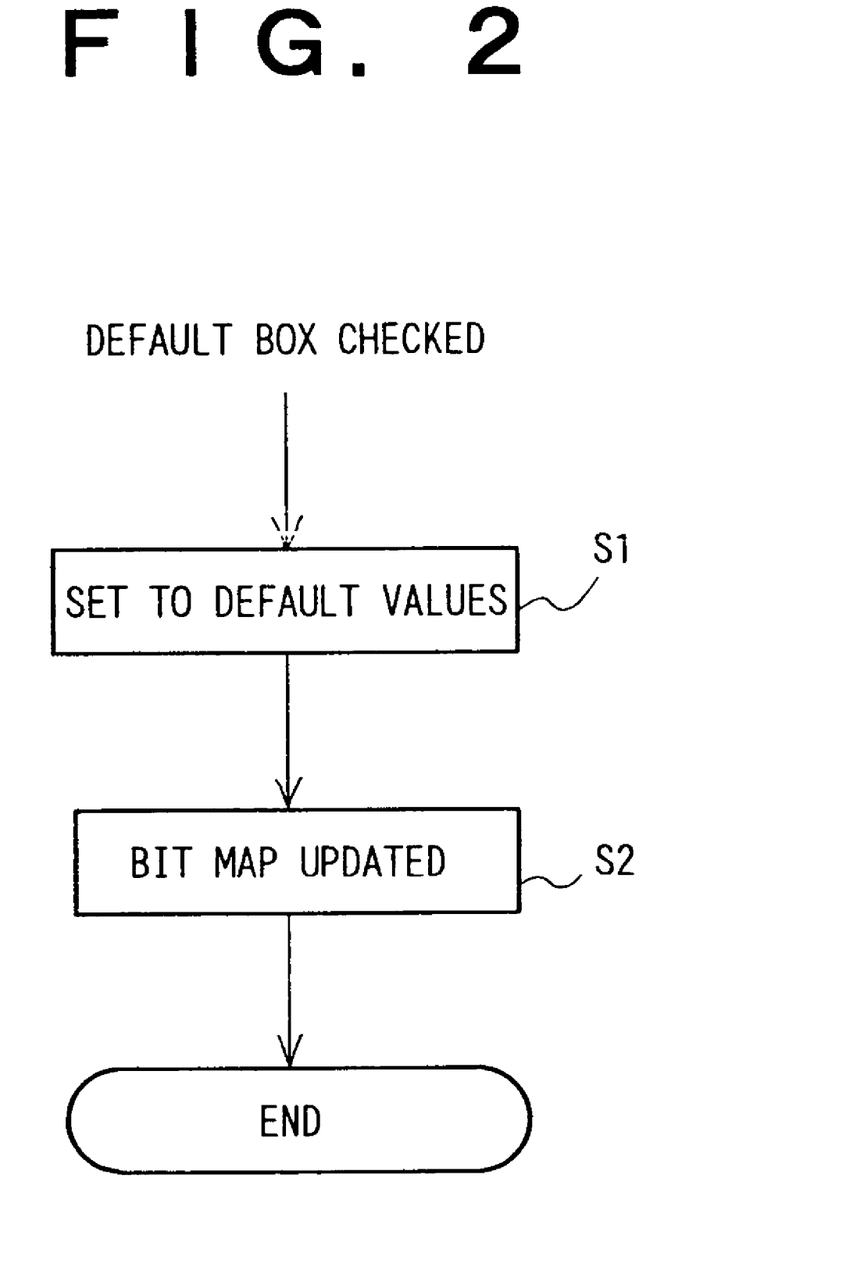
FIG. 2 is a flow chart for illustrating processing when the default box of the RGB ratio adjustment means is checked.

FIG. 2 is a flow chart for illustrating the processing when the default box of the RGB ratio adjustment means 1 is checked. As shown in FIG. 2, when the default box is checked, the percentages of R, G and B are set to the respective default values (step S1), and then the bit map of the gray level representation 11 is updated (step S2).

Figure 3:
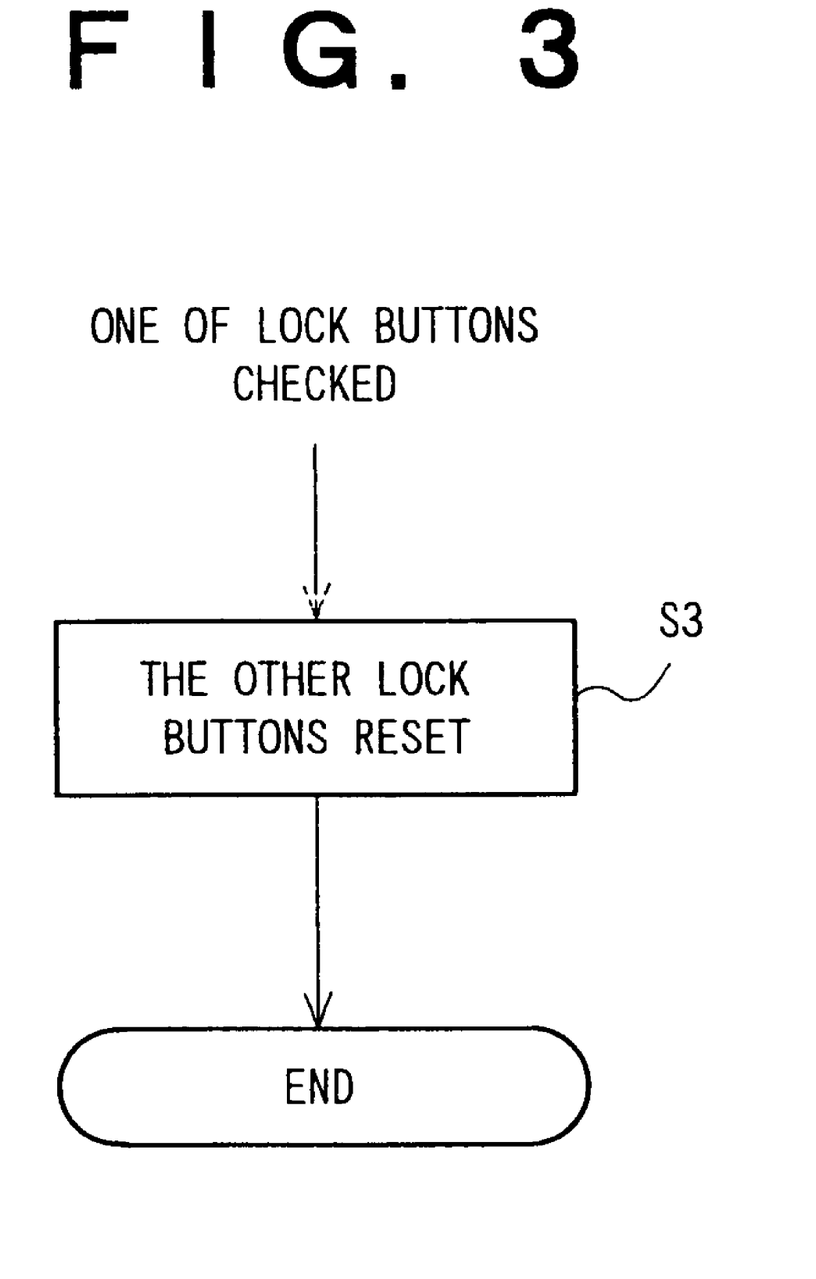
FIG. 3 is a flow chart for illustrating processing when the percentage of one of R, G and B is fixed by the lock button.

FIG. 3 is a flow chart for illustrating the processing when the percentage of one of R, G and B is locked by the lock button 5. As shown in FIG. 3, when the percentage of one of R, G and B is locked by the lock button 5, the lock buttons 5 for the other two colors are automatically reset. (step S3)

Figure 4:
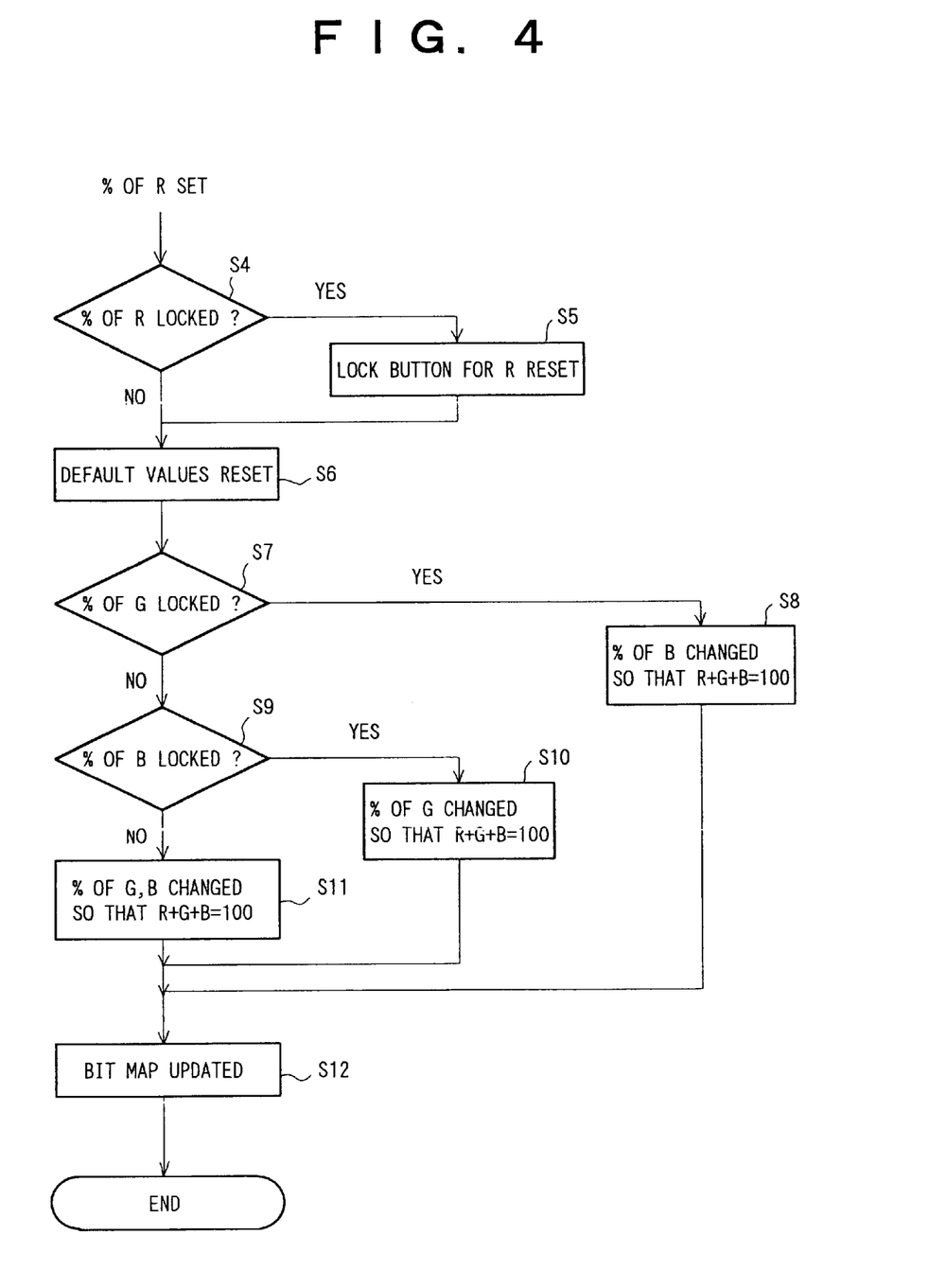
FIG. 4 is a flow chart for illustrating the processing when the percentage of one of R, G and B is set by the slide bar.

FIG. 4 is a flow chart for illustrating the processing when the percentage of one of R, G and B is set by the slide bar 4. For the purpose of simplification, it is assumed here that the percentage of R is set by the slide bar 4.

When the percentage of R is set by the slide bar 4, it is determined whether the percentage of R has been locked. (step S4) When it is determined that the percentage of R has been locked, the default values are reset (step S6) after the lock button 5 for R is reset (step S5). When it is determined that the percentage of R has not been locked, the default values are reset (step S6) immediately after step S4. Then it is determined whether the percentage of G has been locked. (step S7) When it is determined that the percentage of G has been locked, the percentage of B is changed so that the sum of the percentages of R, G and B becomes 100. (step S8) Then the bit map of the gray level representation 11 is updated according to the percentages of R, G and B thus changed. (step S12) When it is determined that the percentage of G has not been locked, it is determined whether the percentage of B has been locked. (step S9) When it is determined that the percentage of B has been locked, the percentage of G is changed so that the sum of the percentages of R, G and B becomes 100. (step S10) Then the bit map of the gray level representation 11 is updated according to the percentages of R, G and B thus changed. (step S12) When it is determined that the percentage of B has not been locked, the percentages of G and B are changed so that the sum of the percentages of R, G and B becomes 100. (step S11) Then the bit map of the gray level representation 11 is updated according to the percentages of R, G and B thus changed. (step S12)

While visually checking the result of the gray conversion in this manner, the RGB ratio is adjusted.

Figure 5:
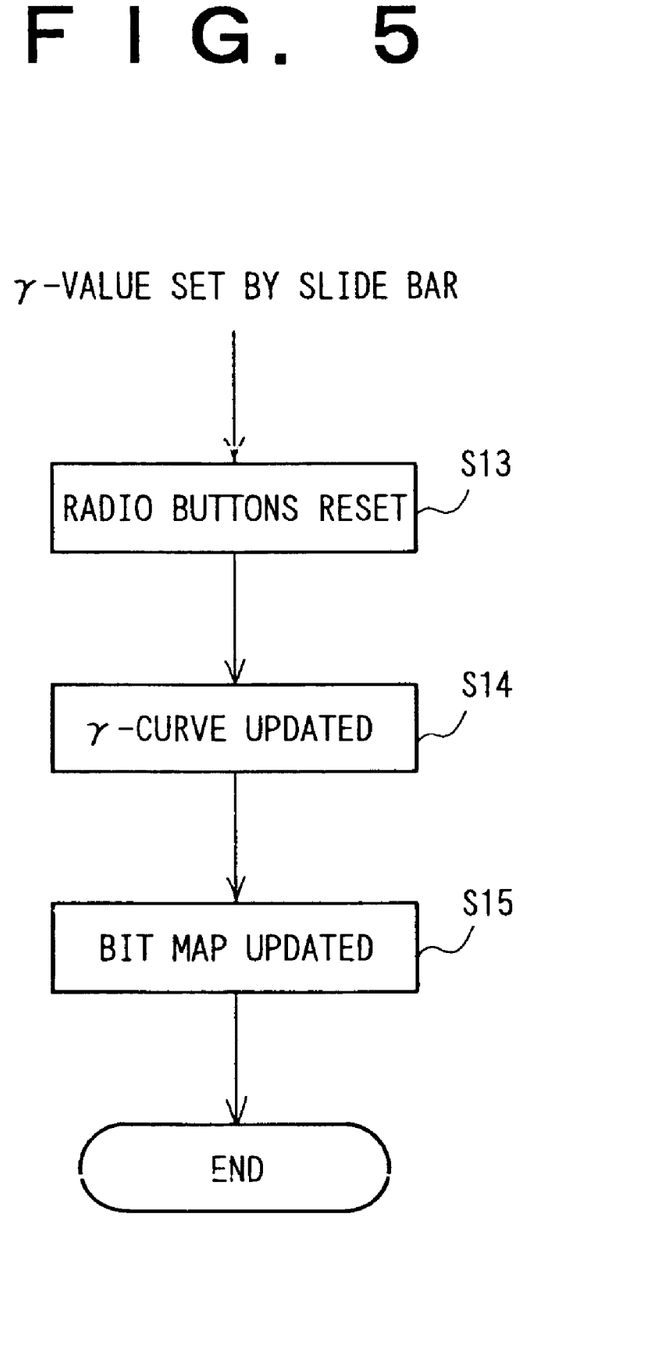
FIG. 5 is a flow chart for illustrating the processing when the $\gamma$-value of one of R, G and B is set by the slide bar.

FIG. 5 is a flow chart for illustrating the processing when the γ-values of R, G and B are set by the slide bar 7. When the slide bar 7 for R, G or B is moved, the radio buttons (linear and ideal) for the color are reset (step S13) and the γ-curve for the color is changed according to the γ-value set by the slide bar 7 (step S14). At the same time, the bit map of the gray level representation 11 is updated according to the γ-value set by the slide bar 7. (step S15)

Figure 6:
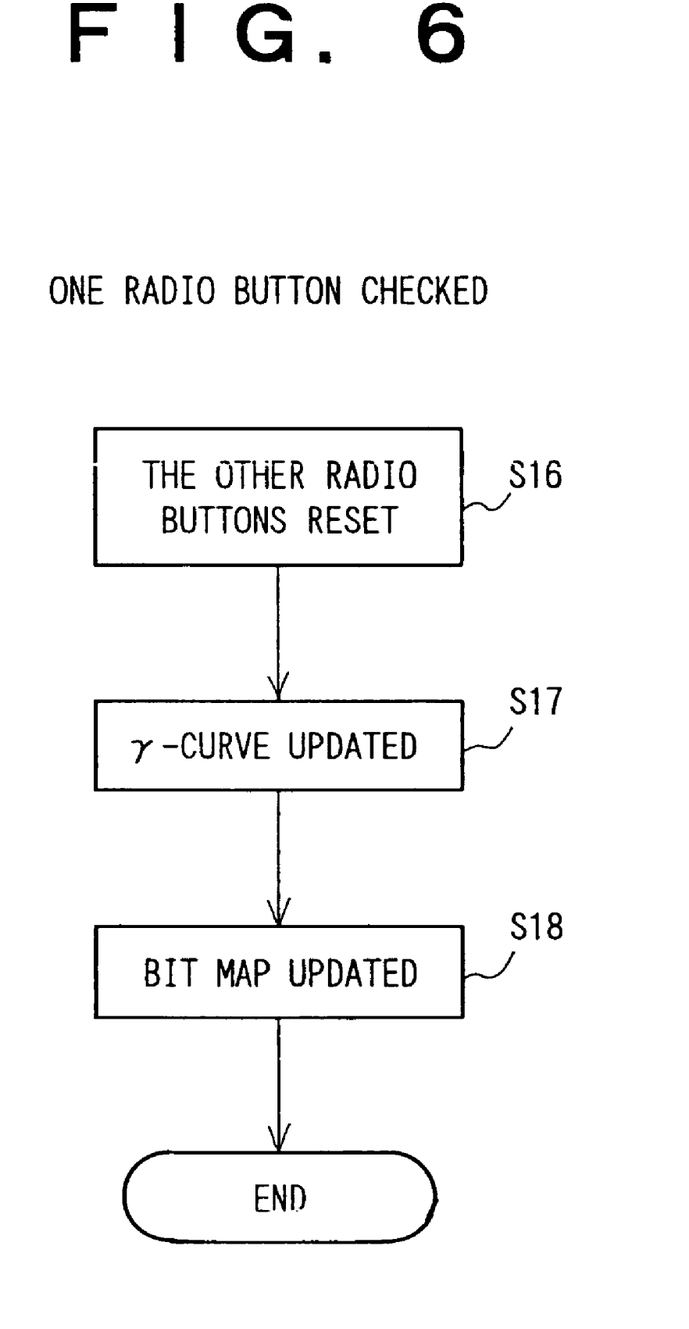
FIG. 6 is a flow chart for illustrating the processing when one of two default $\gamma$-values for each of R, G and B is selected by checking one of the radio buttons.

FIG. 6 is a flow chart for illustrating the processing when one of the two default γ-values 8 for each of R, G and B is selected by checking one of the radio buttons. When one of the two default γ-values 8 of a color is selected by checking one of the radio buttons, the other radio button is reset (step S16) and the γ-curve for the color is changed according to the default γ-value selected (step S17). At the same time, the bit map of the gray level representation 11 is updated according to the default γ-value selected. (step S18)

While visually checking the result of the gray conversion in this manner, the γ-correction is adjusted.

Figure 7:
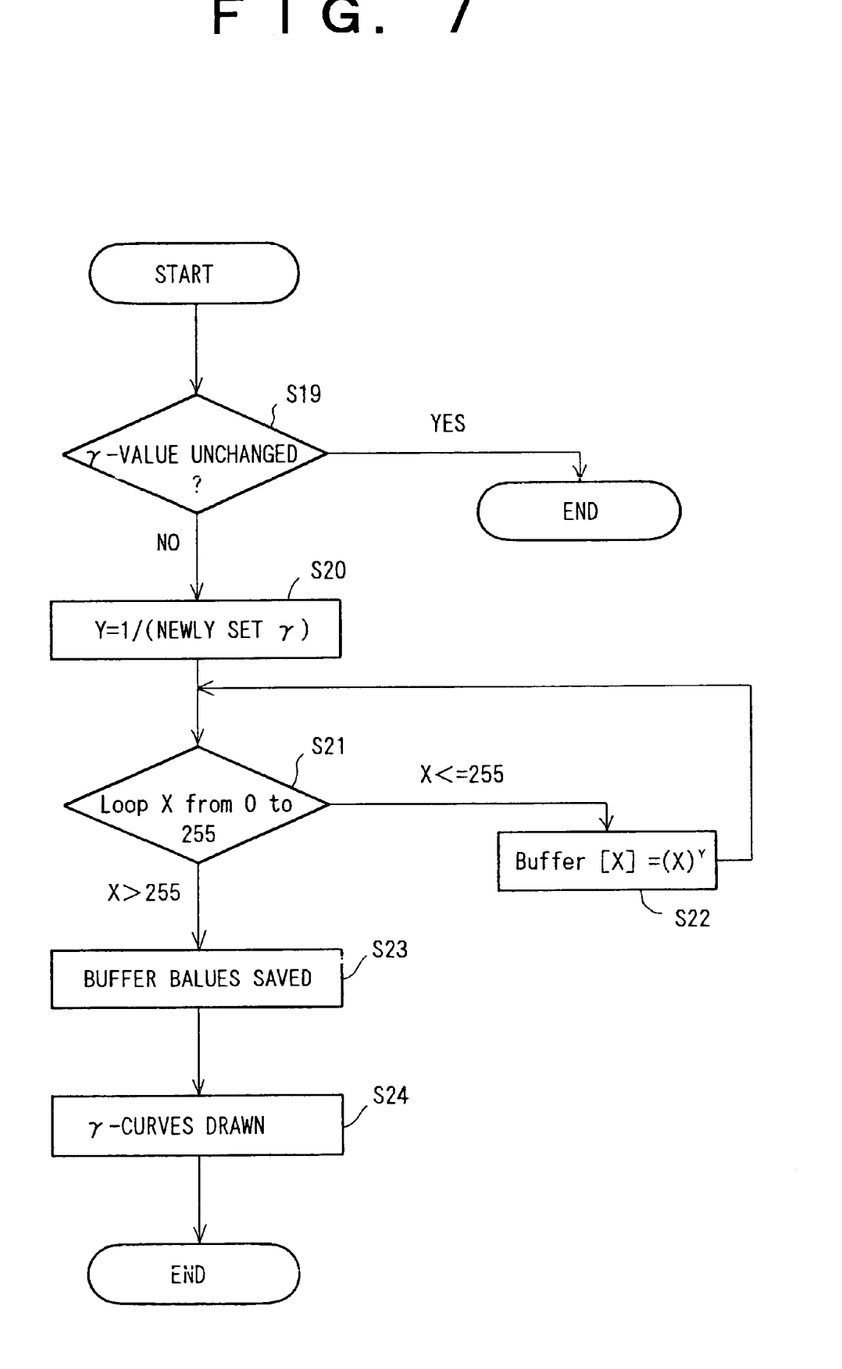
FIG. 7 is a flow chart for illustrating the processing of updating the $\gamma$-curves.
Figure 8:
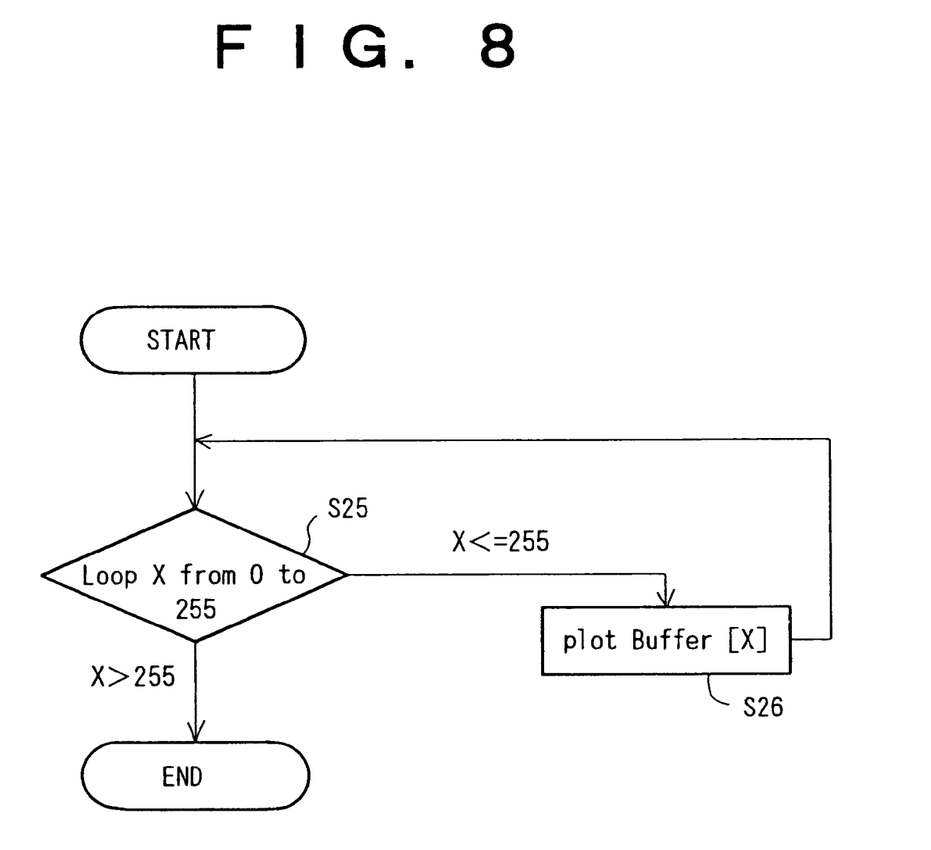
FIG. 8 is a flow chart for illustrating the processing of drawing the $\gamma$-curves.

FIG. 7 is a flow chart for illustrating the processing of updating the γ-curves. It is determined whether the γ-value is unchanged, or whether the newly set γ-value is equal to the preceding value. (step S19) When it is determined that the γ-value is kept unchanged, the γ-curve is not updated. Whereas, when it is determined that the γ-value is changed, the value of 1/(newly set γ-value) is taken as Y (step S20). Then the values of Buffer [X] are calculated according to formula, Buffer $[X]=(X)^Y$, and stored. (steps S21, S22 and S23) X stands for integers from 0 to 255. Then γ-curves 9a, 9b and 9c are drawn according to the drawing processing shown in FIG. 8 (steps S25 and S26) with the values of X as the abscissa and the calculated values of Buffer [X] as the ordinate. (step S24)

Figure 9:
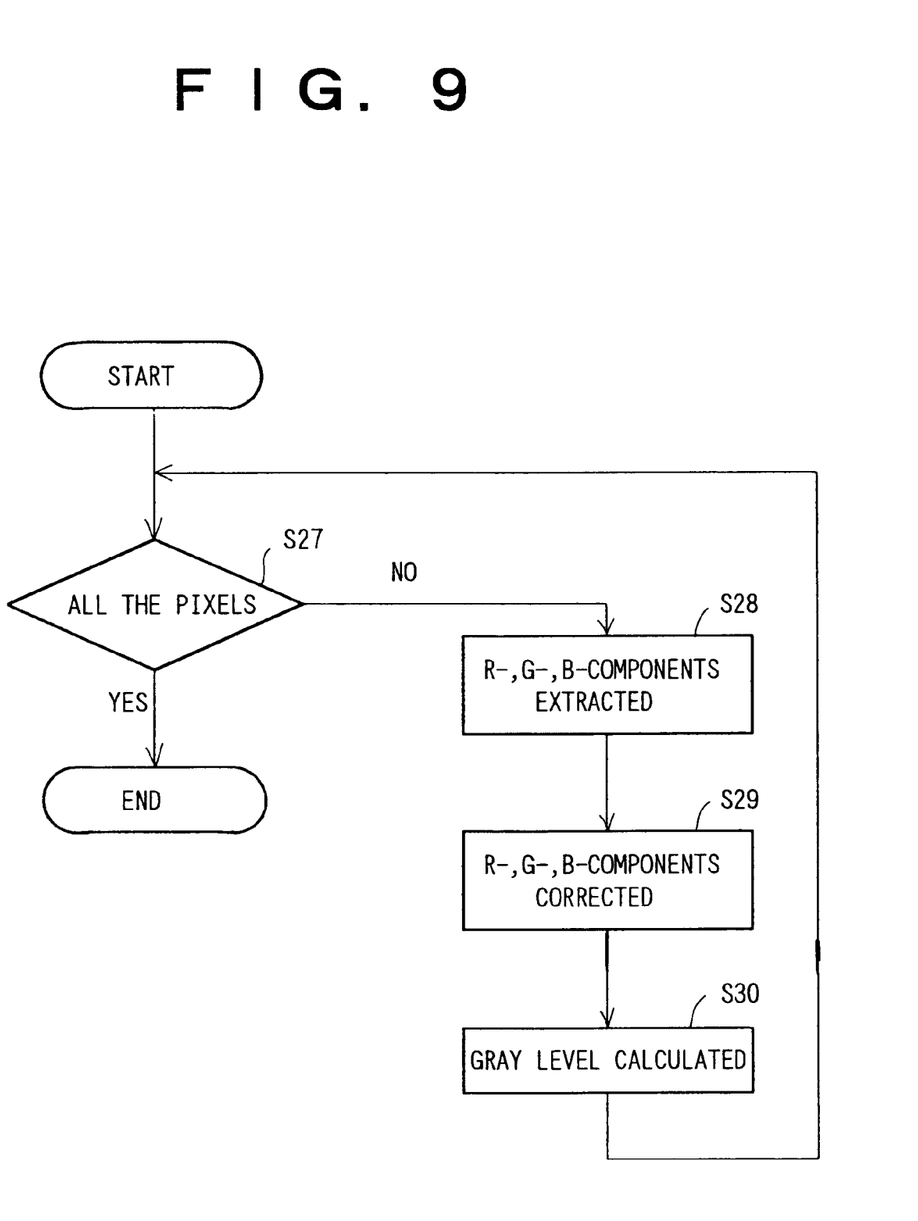
FIG. 9 is a flow chart for illustrating the processing of updating the bit map of the gray level representation.

FIG. 9 is a flow chart for illustrating the processing of updating the bit map of the gray level representation. In this flow chart, the values of R-, G- and B-components of each pixel on the color map 10 are first extracted. (steps S27 and S28) Then the extracted values of R-, G- and B-components of each pixel on the color map 10 are subjected to γ-correction to calculate corrected values of R-, G- and B-components. (step S29) The corrected values of R-, G- and B-components are subjected to the RGB ratio adjustment according to formula $$Gray = \alpha Red + \beta Green + \chi Blue$$

and the gray level is calculated. (step S30) Thereafter, the bit map is updated using the calculated gray level of each pixel.

Though, in the embodiment described above, the result of the RGB ratio adjustment and the γ-correction are graphically shown by the use of a color map 10, for instance, the original color image data may be employed in place of the color map 10. In this case, the influence of the RGB ratio adjustment and the γ-correction on the monochromatic image to be output from the printer can be directly shown. It is preferred in view of the facility of gray conversion that image data representing a reduced original image be used in place of the original color image data.

The present invention need not be limited to the embodiment described above, but the embodiment may be variously modified.

For example, though, in the embodiment described above, the gray conversion is carried out by a utility separate from the printer driver, the utility may be modularized and incorporated in a printer driver or a print control system such as a print manager of an OS.

Further, though in the embodiment described above, the RGB ratio and the γ-value are set by moving slide bars, the RGB ratio and the γ-value may be input as figures through a keyboard.

What is claimed is:

1. A gray conversion method for converting original color image data to halftone image data having information on density of pixels by a predetermined gray conversion, the halftone image data being to be input into a monochromatic printer when a color image represented by the original color image data is to be printed by the monochromatic printer, the method characterized in that said predetermined gray conversion includes an RGB ratio adjustment for setting the ratio of R, G and B in the original color image data, said RGB ratio adjustment being calculated to an optimal value using the formula $$\text{Gray} = \alpha\text{Red} + \beta\text{Green} + \chi\text{Blue}$$

an RGB ratio adjustment is carried out on reference image data employing different ratios of R, G and B, the results of the predetermined gray conversions including the RGB ratio adjustments employing the different ratios of R, G and B carried out on the reference image data are graphically shown on a screen, the optimal value of the ratio of R, G and B is determined on the basis of comparison of the results of the predetermined gray conversions graphically shown on the screen, and the predetermined gray conversion including an RGB ratio adjustment employing the optimal value of the ratio of R, G and B is carried out on the original color image data.

2. A gray conversion method as defined in claim 1, in which the reference image data is derived from the original color image data.

3. A gray conversion method as defined in claim 2, in which the image data derived from the original color image data is image data representing a reduced original image.

4. A gray conversion method as defined in claim 1, in which the reference image data is image data representing a color map.

5. A gray conversion method as defined in claim 1, in which the method is carried out by a printer driver.

6. A gray conversion method as defined in claim 1, in which the method is carried out by a utility which is positioned between image application software and a printer driver and operates in combination with the printer driver.

7. A gray conversion method as defined in claim 1, in which the method is carried out be a print control system of an operating system of a computer.

8. A gray conversion method as defined in claim 1, in which said predetermined gray conversion includes, in addition to the RGB ratio adjustment, a γ-correction in which a γ-curve and/or a γ-value is adjusted, a γ-correction is carried out on the reference image data employing different γ-curves and/or γ-values, the results of the γ-correction carried out on the reference image data employing the different γ-curves and/or γ-values are graphically shown on a screen, the optimal γ-curve and/or the γ-value is determined on the basis of comparison of the results of the γ-correction graphically shown on the screen, and the predetermined gray conversion including an RGB ratio adjustment employing the optimal value of the ratio of R, G and B and a γ-correction employing the optimal γ-curve and/or the γ-value is carried out on the original color image data.

9. A gray conversion apparatus comprising a gray conversion means which carries out a predetermined gray conversion on original color image data to convert the original color image data into halftone image data having information on density of pixels, the halftone image data being to be input into a monochromatic printer when a color image represented by the original color image is to printed by the monochromatic printer, the apparatus characterized in that the gray conversion means includes an RGB ratio adjustment means which carries out an RGB ratio adjustment for setting the ratio of of R, G and B in the original color image data to an optimal value using the formula: Gray =αRed+βGreen+ χBlue, and carries out an RGB ratio adjustment on reference image data employing different ratios of R, G and B, a graphic display means which graphically shows the results of the predetermined gray conversions including the RGB ratio adjustments employing the different ratios of R, G and B carried out on the reference image data on a screen, and an RGB ratio determining means which determines the optimal value of the ratio of R, G and B on the basis of comparison of the results of the predetermined gray conversions graphically shown on the screen, and the gray conversion means carries out the predetermined gray conversion including an RGB ratio adjustment employing the optimal value of the ratio of R, G and B determined by the RGB ratio determining means on the original color image data.

10. A gray conversion apparatus as defined in claim 9, in which the reference image data is image data derived from the original color image data.

11. A gray conversion apparatus as defined in claim 10, in which the image data derived from the original color image data is image data representing a reduced original image.

12. A gray conversion apparatus as defined in claim 9, in which the reference image data is image data representing a color map.

13. A gray conversion apparatus as defined in claim 9, in which the gray conversion means is incorporated in a printer driver.

14. A gray conversion apparatus as defined in claim 9, in which the gray conversion means is in the form of a utility which is positioned between image application software and a printer driver and operates in combination with the printer driver.

15. A gray conversion apparatus as defined in claim 9, in which the gray conversion means is incorporated in a print control system of an operating system of a computer.

16. A gray conversion apparatus as defined in claim 9, in which said gray conversion means further comprises a γ-correction means which carries out a γ-correction on the reference image data employing different γ-curves and/or γ-values, a graphic display means which graphically shows the results of the γ-corrections carried out on the reference image data employing the different γ-curves and/or γ-values on a screen, and a γ-correction condition determining means which determines the optimal γ-curve and/or the γ-value on the basis of comparison of the results of the γ-correction graphically shown on the screen, and the gray conversion means carries out the predetermined gray conversion including an RGB ratio adjustment employing the optimal value of the ratio of R, G and B and a γ-correction employing the optimal γ-curve and/or the γ-value on the original color image data.

* * * * *